United States Patent Office 3,199,997
Patented Aug. 10, 1965

3,199,997
PROCESS FOR PRODUCING CALCINED PRODUCTS FROM BY-PRODUCT GYPSUM
Elmer S. Johnson, deceased, late of Arlington Heights, Ill., by Lucille G. Johnson, executrix, Arlington Heights, Ill., assignor to United States Gypsum Company, Chicago, Ill., a corporation of Illinois
No Drawing. Filed Nov. 13, 1962, Ser. No. 237,788
3 Claims. (Cl. 106—110)

This invention relates to the production of improved calcined products from gypsum obtained as a by-product from the manufacture of phosphoric acid.

As is well-known, phosphoric acid can be produced by treating raw phosphate-bearing materials such as calcium phosphate rock with sulfuric acid. As a result of this treatment there is produced as a by-product, gypsum of relatively high purity but containing some residual acids or acidic impurities. Large quantities of such by-product gypsum are produced annually and accordingly satisfactory utilization thereof becomes of considerable economic importance. However, it has been found that calcination of this by-product gypsum produces a calcined product or stucco which is generally substantially inferior in quality, particularly with respect to strength characteristics, than stucco produced from natural gypsum. Experience has shown that the strength of stucco produced from by-product gypsum is generally only about 50% or less than the strength of stucco produced from natural gypsum under similar calcination conditions.

It would appear that the residual acidic impurities present in the by-product gypsum are detrimental to the production of high-quality high strength calcined products therefrom. Moreover, these acidic contaminants, present in by-product gypsum in substantially large amounts in comparison to nautral gypsum, render it highly corrosive to processing equipment and complicate handling thereof. For these reasons it is desirable to neutralize the acidic constituents present in the by-product gypsum prior to and/or during the calcining operation. While neutralization of the acidic constituents in the by-product gypsum reduces the corrosion and handling problems it does not significantly improve the quality of the calcined product or stucco.

It has now been found that high-quality, high-strength calcined products can be obtained from by-product gypsum by neutralizing the acid constituents released during calcination of the gypsum, and subsequently acidifying the calcined product. By this combination of treatments, it is possible to produce from by-product gypsum a stucco having strength characteristics comparable or superior to stucco produced from natural gypsum.

According to one preferred embodiment of the present invention gypsum obtained as a by-product from the manufacture of phosphoric acid is calcined in the presence of an acid neutralizing agent such as lime. While lime is a preferred neutralizing agent, because of cost, availability and basic properties, other suitable acid neutralizing agents such as calcium hydroxide, and the like can also be employed. The acid neutralizing agent is employed in amounts sufficient to provide a pH in the gypsum during calcination above 7.0 and preferably from about 7.0 to 9.0 so as to effectively neutralize the acidic constituents released from the gypsum during calcination.

The calcining operation is carried out in any suitable manner according to conventional procedures to produce calcined products which include stucco and plaster. Thus, for example, calcination can be carried out by heating the by-product gypsum at atmospheric pressure in either a kettle or a rotary calciner to produce a stucco referred to as regular calcined gypsum. Also the calcination can be carried out by heating the by-product gypsum under controlled vapor pressure conditions in the presence of steam or in aqueous solution to produce a stucco known as alpha gypsum. The physical differences between these two stuccos are well known to the art as are the specific temperatures, pressures and heating times required for the production of each type; see for example U.S. Patent 2,907,668, and the patents mentioned therein, the disclosures of which are herein incorporated by reference thereto.

After calcination, aluminum sulfate is added to the calcined gypsum or stucco in an amount sufficient to provide a pH below about 7, and preferably in the range from about pH 4 to pH 7. The specific amount of aluminum sulfate to employ will depend, of course, upon the initial alkalinity of the calcined product. The aluminum sulfate can be added to the stucco in aqueous or dry form.

The significant improvement in stucco produced from by-product gypsum in accordance with the invention is apparent from the data tabulated in Table I below. In these runs, calcium hydroxide was added to provide a pH as indicated during the calcination of the gypsum. After calcination, aluminum sulfate $[Al_2(SO_4)_3 \cdot 15H_2O]$ was added to certain of the calcined products in the amounts indicated, the aluminum sulfate being added in solution form in the water employed for mixing with the stucco with the exception of sample 5 in which it was added to the stucco in dry form after which the mixing water was added.

*Table I*

| Stucco Sample | Calcination Time | | Temperature when calcination was terminated in ° F. | Parts of mixing water added to 100 parts stucco by weight | Pounds of Ca(OH)$_2$ added per ton gypsum | pH gypsum during calcination | Pounds of Al$_2$(SO$_4$)$_3$ 15 H$_2$O added per ton stucco | Dry density in pounds per cubic foot | Dry compressive strength in pounds per square inch | Final pH of stucco |
|---|---|---|---|---|---|---|---|---|---|---|
| | Hrs. | Mins. | | | | | | | | |
| 1 | 1 | 25 | 340 | 74 | 10.0 | 9.5 | 0 | 65.4 | 280 | 9.5 |
| 2 | 1 | 25 | 340 | 74 | 10.0 | 9.5 | 10.0 | 65.6 | 1,325 | 4.0 |
| 3 | 1 | 40 | 340 | 80 | 11.0 | 8.5 | 0 | 59.3 | 508 | 8.5 |
| 4 | 1 | 40 | 340 | 80 | 11.0 | 8.5 | 20.0 | 62.8 | 2,122 | 4.0 |
| 5 | 1 | 40 | 340 | 80 | 11.0 | 8.5 | 10.0 | 61.5 | 1,802 | 4.0 |
| 6 | 1 | 30 | 340 | 84 | 17.5 | 9.5 | 0 | 54.4 | 427 | 9.5 |
| 7 | 1 | 30 | 340 | 84 | 17.5 | 9.5 | 30.0 | 56.9 | 635 | 7.5 |
| 8 | 1 | 30 | 340 | 84 | 17.5 | 9.5 | 40.0 | 58.0 | 1,371 | 4.0 |
| 9 | 2 | 10 | 330 | 0 | 13.3 | 9.5 | 0 | Extremely Weak | | 9.5 |
| 10 | 2 | 10 | 330 | 84 | 13.3 | 9.5 | 20.0 | 58.9 | 740 | 7.5 |
| 11 | 2 | 10 | 330 | 84 | 13.3 | 9.5 | 40.0 | 64.7 | 1,665 | 4.0 |

The necessity of treating the stucco after calcination with aluminum sulfate in an amount sufficient to provide a pH on the acid side is evident from the above. As will be noted, an acid pH is required in the final stucco in order to achieve maximum compressive strength.

The improved stucco produced in accordance with this invention is satisfactory for numerous applications in which a high-strength stucco is desired. As is well known in the art, paper covered gypsum boards are made by enclosing a mass of plastic water gauged calcined gypsum composition between paper sheets and allowing the resulting product to set up; thereafter it is dried and cut up into sheets of the desired size. One of the essential features of such a plasterboard is a firm adherence of the central gypsum core to the cover sheets so that the board will not delaminate at the interface between the core and the cover sheets. Stucco produced by the process of the present invention is eminently satisfactory for use as core for plasterboard and exhibits excellent bonding characteristics with the paper. Foaming agents such as rosin soap can be employed with the stucco as is known in the art to reduce its density and to produce a lightweight plasterboard.

Table II below includes various data pertaining to stucco produced in accordance with the invention and its use as a central core for plasterboard. A foaming agent was employed with the stucco in order to reduce its density. In Table II, sample A is stucco produced from one source of by-product gypsum and samples B and C are stuccos produced from by-product gypsum from another source. The pH values indicated in the table resulted from adding calcium hydroxide to the gypsum so as to neutralize acidic constituents thereof during calcination.

heretofore associated with by-product gypsum. It will thus be appreciated that the process of the present invention is eminently novel and economically advantageous.

Those modifications and equivalents which fall within the spirit of the invention and the scope of the appended claims are to be considered part of the invention.

What is claimed is:

1. A process of preparing a calcined gypsum product which comprises adding calcium hydroxide to by-product gypsum from acid manufacture, the calcium hydroxide being employed in an amount sufficient to provide a pH in the by-product gypsum above 7, calcining said by-product gypsum while maintaining therein a pH above 7 and then treating the calcined gypsum product with aluminum sulfate to provide a final pH therein not above 7.

2. A process of preparing a calcined gypsum product which comprises adding lime to by-product gypsum from acid manufacture, the lime being employed in an amount sufficient to provide a pH in the by-product gypsum above 7, calcining said by-product gypsum while maintaining therein a pH above 7 and then treating the calcined gypsum product with aluminum sulfate to provide a final pH therein not above 7.

3. A process of preparing a calcined gypsum product which comprises adding lime to by-product gypsum from acid manufacture, the lime being employed in an amount

*Table II*

| | Sample A | | Sample B | | Sample C | |
|---|---|---|---|---|---|---|
| | Dry $Al_2(SO_4)_3$ added to Dry Stucco | $Al_2(SO_4)_3$ added to mixing water | Dry $Al_2(SO_4)_3$ added to Dry Stucco | $Al_2(SO_4)_3$ added to mixing water | Dry $Al_2(SO_4)_3$ added to Dry Stucco | $Al_2(SO_4)_3$ added to mixing water |
| pH of stucco prior to adding $Al_2(SO_4)_3$ | 8.5 | 8.5 | 8.3 | 8.3 | 8.4 | 8.4. |
| Amount of $Al_2(SO_4)_3$ per amount of stucco, by weight to provide a pH below 7 in final stucco. | 1% | 1% | 1% | 1% | 1% | 1%. |
| Parts water added to 100 parts stucco by weight | 68 | 68 | 67 | 67 | 72 | 72. |
| Dry density in pounds per cubic foot | 47.2 | 47.7 | 47.9 | 47.4 | 47.3 | 47.8. |
| Dry compressive strength in pounds per square inch | 652 | 678 | 700 | 709 | 765 | 794. |
| Stucco bond to paper (i.e. a paper wrapped board prepared from the stucco and the observed bond between the stucco and paper). | 10% split | Slight split | Slight split | Slight split | No split | Very slight split. |

The above data shows the excellent bonding strength with paper of stucco produced in accordance with the present invention, thus indicating the suitability of such stucco for use in plasterboard. The above data shows also that the aluminum sulfate can be added to the stucco in either dry or aqueous form with comparable results.

By means of the present invention it is possible to prepare from by-product gypsum calcined products having equal or superior strength characteristics than calcined products prepared from natural gypsum. Accordingly, as a result of the described process, gypsum produced as a by-product in the manufacture of acids can be employed in lieu of natural gypsum to prepare high-quality high-strength calcined gypsum products. By means of the present invention it is possible to prepare eminently satisfactory calcined gypsum products from by-product gypsum while eliminating the corrosion and handling problems sufficient to provide a pH in the by-product gypsum ranging from 7 to 9, calcining said by-product gypsum while maintaining therein a pH in the range from 7 to 9 and then treating the calcined gypsum product with aluminum sulfate to provide a final pH therein not above 7.

References Cited by the Examiner

UNITED STATES PATENTS

| | | | |
|---|---|---|---|
| 1,900,381 | 3/33 | Hansen | 106—110 |
| 1,937,292 | 11/33 | Moore | 106—110 |
| 1,989,641 | 1/35 | King | 106—110 |
| 2,820,714 | 1/58 | Schneiter et al. | 106—110 |
| 2,937,926 | 5/60 | Hanusch | 23—122 |
| 3,047,447 | 7/62 | Stasse | 23—122 |

TOBIAS E. LEVOW, *Primary Examiner.*